(12) United States Patent
Kim et al.

(10) Patent No.: US 12,073,830 B2
(45) Date of Patent: Aug. 27, 2024

(54) ELECTRONIC APPARATUS AND CONTROL METHOD THEREOF

(71) Applicant: SAMSUNG ELECTRONICS CO., LTD., Suwon-si (KR)

(72) Inventors: Hoyeon Kim, Suwon-si (KR); Minkyu Park, Suwon-si (KR); Hyungsun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 310 days.

(21) Appl. No.: 17/533,918

(22) Filed: Nov. 23, 2021

(65) Prior Publication Data
US 2022/0139392 A1 May 5, 2022

Related U.S. Application Data

(63) Continuation of application No. PCT/KR2021/014735, filed on Oct. 20, 2021.

(30) Foreign Application Priority Data

Nov. 5, 2020 (KR) .................. 10-2020-0146662

(51) Int. Cl.
*G10L 15/22* (2006.01)
*G10L 15/08* (2006.01)
*H04R 1/40* (2006.01)

(52) U.S. Cl.
CPC .............. *G10L 15/22* (2013.01); *G10L 15/08* (2013.01); *H04R 1/406* (2013.01); *G10L 2015/088* (2013.01); *G10L 2015/223* (2013.01)

(58) Field of Classification Search
CPC ... G10L 15/22; G10L 15/08; G10L 2015/088; G10L 2015/223; H04R 1/406
USPC ........................................................ 704/275
See application file for complete search history.

(56) References Cited

U.S. PATENT DOCUMENTS 9,113,240 B2  8/2015  Ramakrishnan et al.
9,288,331 B2  3/2016  Mauchly et al.
(Continued)

FOREIGN PATENT DOCUMENTS

CN        109314832 B  *  1/2021  .......... G10L 19/008
KR   10-2012-0066134 A     6/2012
(Continued)

OTHER PUBLICATIONS

S. Hossain, S. S. Khan, M. S. H. Sunny and M. Ahmad, "Frequency component grouping based sound source extraction from mixed audio signals using spectral analysis," 2017 3rd International Conference on Electrical Information and Communication Technology (EICT), Khulna, Bangladesh, 2017, pp. 1-6, doi: 1 (Year: 2017).*
(Continued)

*Primary Examiner* — Bharatkumar S Shah
(74) *Attorney, Agent, or Firm* — Sughrue Mion, PLLC

(57) ABSTRACT

An electronic apparatus is provided. The electronic apparatus includes an interface configured to receive a first audio signal from a first microphone set and receive a second audio signal from a second microphone set provided at a position different from that of the first microphone set; a processor configured to: obtain a plurality of first sound-source components based on the first audio signal and a plurality of second sound-source components based on the second audio signal; identify a first sound-source component, from among the plurality of first sound-source components, and a second sound-source component, from among the plurality of second sound-source components, that correspond to each other; identify a user command based on the first sound-source component and the second sound-source component; and control an operation corresponding to the user command.

18 Claims, 8 Drawing Sheets

(56) References Cited

U.S. PATENT DOCUMENTS

| | | | |
|---|---|---|---|
| 2009/0238377 | A1 | 9/2009 | Ramakrishnan et al. |
| 2012/0158404 | A1 | 6/2012 | Shin |
| 2013/0044893 | A1 | 2/2013 | Mauchly et al. |
| 2013/0297319 | A1* | 11/2013 | Kim ................. G10L 15/22 704/E21.001 |
| 2016/0125882 | A1 | 5/2016 | Contolini et al. |
| 2017/0278519 | A1* | 9/2017 | Visser ................. H04R 3/005 |
| 2018/0098167 | A1 | 4/2018 | Welch et al. |
| 2019/0098399 | A1 | 3/2019 | Lashkari |
| 2019/0108837 | A1 | 4/2019 | Christoph et al. |
| 2019/0306619 | A1 | 10/2019 | Yazu |
| 2020/0145753 | A1 | 5/2020 | Rollow, IV |
| 2020/0160861 | A1 | 5/2020 | Lee |
| 2023/0208921 | A1* | 6/2023 | Dickins ............. H04L 67/141 381/95 |

FOREIGN PATENT DOCUMENTS

| | | |
|---|---|---|
| KR | 10-2016-0002057 A | 1/2016 |
| KR | 10-2019-0005617 A | 1/2019 |
| KR | 10-2020-0057516 A | 5/2020 |

OTHER PUBLICATIONS

S. Hossain, S. S. Khan, M. S. H. Sunny and M. Ahmad, "Frequency component grouping based sound source extraction from mixed audio signals using spectral analysis," 2017 3rd International Conference on Electrical Information and Communication Technology (EICT), Khulna, Bangladesh, 2017, pp. 1-6, doi: (Year: 2017).*

Kameoka, Hirokazu et al., "Complex NMF: A New Sparse Representation for Acoustic Signals", Published in: 2009 IEEE International Conference on Acoustics, Speech and Signal Processing, 2009, pp. 3437-3440. (4 pages total).

Communication dated Feb. 10, 2022, issued by the International Searching Authority in counterpart International Application No. PCT/KR2021/014735 (PCT/ISA/210 and PCT/ISA/237).

Extended European Search Report dated Apr. 22, 2024 in European Application No. 21889435.0.

Supplementary European Search Report dated Feb. 8, 2024 in European Application No. 21889435.0.

* cited by examiner

ELECTRONIC APPARATUS AND CONTROL METHOD THEREOF

CROSS-REFERENCE TO RELATED APPLICATIONS

This application is a Continuation Application of International Application PCT/KR2021/014735 filed on Oct. 20, 2021, which claims benefit of Korean Patent Application No. 10-2020-0146662, filed on Nov. 5, 2020, at the Korean Intellectual Property Office, the disclosures of which are incorporated herein in their entireties by reference.

TECHNICAL FIELD

The disclosure relates to an electronic apparatus, in which audio collected after a user utters a trigger word is processed to undergo speech recognition, and a control method thereof, and more particularly to an electronic apparatus in which, when collected audios include a plurality of sound-source corresponding audios, audio based on a user's utterance is identified among the plurality of sound-source corresponding audios, and a control method thereof.

BACKGROUND ART

To compute and process predetermined information in accordance with certain processes, an electronic apparatus includes a central processing unit (CPU), a chipset, a memory, and the like electronic components for the computation. Such an electronic apparatus may be variously classified in accordance with what information will be processed and what it is used for. For example, the electronic apparatus may be classified as an information processing apparatus such as a personal computer (PC), a server or the like for processing general information; an image processing apparatus for processing image data; an audio apparatus for audio processing; home appliances for miscellaneous household chores; etc. The image processing apparatus may be embodied as a display apparatus that displays an image based on processed image data on its own display panel. Such an electronic apparatus may have various functions for a user experience. For example, the electronic apparatus may have a speech recognition function of to recognize an input user utterance, and may perform an operation instructed by the recognized user utterance.

The electronic apparatus may include a microphone to receive an utterance. The electronic apparatus does not just collect sounds of surrounding environments through the microphone, but may more accurately collect the user utterance among many sounds through beamforming or similar method. For example, when a user utters a trigger word for speech recognition, the microphone detects the trigger word. A beamforming-type microphone strengthens a channel of a sound received in a direction where the trigger word is detected, and weakens channels of sounds received in other directions (i.e., channels that do not correspond to the direction where the trigger word was detected). Although there is a plurality of sound sources corresponding to an utterance (i.e., although sound sources other than the user are present in surrounding environments), the electronic apparatus performs sound collection focused in a direction where the user utters the sound through the beamforming-type microphone, thereby more accurately obtaining audio corresponding to user utterance.

However, sound sources other than the user may be present in the beamforming direction of the microphone. In this case, the audio collected by the microphone includes audio components corresponding to the plurality of sound sources, and it may be difficult for the electronic apparatus to identify which of the audio components corresponding to the plurality of sound sources is caused by the user utterance. In this respect, there is a need for an electronic apparatus capable of identifying an audio component caused by a user utterance in audio received through the microphone when there are sound sources other than the user in an environment where the user is present.

DISCLOSURE

Technical Solution

According to embodiments of the disclosure an electronic apparatus includes: an interface configured to receive a first audio signal from a first microphone set and receive a second audio signal from a second microphone set provided at a position different from that of the first microphone set; a processor configured to: obtain a plurality of first sound-source components based on the first audio signal and a plurality of second sound-source components based on the second audio signal; identify a first sound-source component, from among the plurality of first sound-source components, and a second sound-source component, from among the plurality of second sound-source components, that correspond to each other; identify a user command based on the first sound-source component and the second sound-source component; and control an operation corresponding to the user command.

The first microphone set may be configured to focus in a first angle corresponding to the first audio signal and the second microphone set may be configured to focus in a second angle corresponding to the second audio signal, based on a preset trigger word being received.

The processor may be further configured to select the first microphone set and the second microphone set from among a plurality of microphone sets, based on reliability of sound collection performed in each of the plurality of microphone sets.

The processor may be further configured to: identify the user command based on a microphone set from among the plurality of microphone sets, of which reliability is highest; and select the first microphone set and the second microphone set from among the plurality of microphone sets based on the operation not being normally performed.

The processor may be further configured to: select a third audio signal from among a plurality of audio signals based on the plurality of first sound-source components not being normally identified from the first audio signal; identify a plurality of third sound-source components based on the third audio signal; and compare the plurality of third sound-source components with the plurality of second sound-source components.

The processor may be further configured to control the electronic apparatus to generate a notification indicating that a speech recognition operation corresponding to the first audio signal is not performed.

The processor may be further configured to control the electronic apparatus to receive the first audio signal from a first device comprising the first microphone set through the interface and to receive the second audio signal from a second device comprising the second microphone set through the interface.

The processor may be further configured to identify a plurality of Euclidean distances between the plurality of first sound-source components and the plurality of second sound-source components, and identify the first sound-source component and the second sound-source component based on a Euclidean distance between the first sound-source component and the second sound-source component being a shortest distance from among the plurality of Euclidean distances.

The processor may be further configured to select sound-source components which will be subjected to comparison, from among the plurality of first sound-source components and the plurality of second sound-source components, based on time characteristics.

The processor is further configured to identify sound-source components which are constant over a period of time, from among the plurality of first sound-source components and the plurality of second sound-source components, and exclude the identified sound-source components from the sound-source components to be subjected to the comparison.

According to embodiments of the disclosure a method of controlling an electronic apparatus includes: obtaining a plurality of first sound-source components based on a first audio signal obtained from a first microphone set; obtaining a plurality of second sound-source components based on a second audio signal obtained from a second microphone set provided at a position different from that of the first microphone set; identifying a first sound-source component, from among the plurality of first sound-source components, and a second sound-source component, from among the plurality of second sound-source components, that correspond to each other; identifying a user command based on the first sound-source component and the second sound-source component; and performing an operation corresponding to the user command.

The method may further include focusing the first microphone set and the second microphone set in a direction where a preset trigger word is received.

The method may further include selecting the first microphone set and the second microphone set from among a plurality of microphone sets, based on reliability of sound collection performed in each of the plurality of microphone sets.

The method may further include: attempting to identify the user command based on a microphone set from among the plurality of microphone sets, of which reliability is highest; and selecting the first microphone set and the second microphone set from among the plurality of microphone sets based on the operation not being normally performed.

The method may further include: selecting a third audio signal from among a plurality of audio signals based on the plurality of first sound-source components not being normally identified from the first audio signal; identifying a plurality of third sound-source components based on the third audio signal; and comparing the plurality of third sound-source components with the plurality of second sound-source components.

According to embodiments of the disclosure apparatus includes: an interface; and a processor configured to: obtain a plurality of first sound-source components corresponding to a first audio signal and a plurality of second sound-source components corresponding to a second audio signal; identify a first sound-source component, from among the plurality of first sound-source components, that corresponds to a second sound-source component, from among the plurality of second sound-source components; identify a user command based on the first sound-source component and the second sound-source component; and control an operation based on the user command.

The interface may be configured to receive the first audio signal and the second audio signal.

The interface may be configured to receive the first audio signal from a first external device and the second audio signal from a second external device.

The interface may include a first microphone configured to generate the first audio signal and a second microphone configured to generate the second audio signal.

The first microphone may be one of a first plurality of microphones and the second microphone may be one of a second plurality of microphones, and the processor may be further configured to: detect a trigger word using the first microphone or the second microphone; and perform a beamforming operation to identify the first microphone and the second microphone based on the trigger word.

According to embodiments of the disclosure a non-transitory computer readable medium having embodied thereon a program, which when executed by a processor, causes the processor to execute a method, the method including: obtaining a plurality of first sound-source components based on a first audio signal obtained from a first microphone set; obtaining a plurality of second sound-source components based on a second audio signal obtained from a second microphone set provided at a position different from that of the first microphone set; identifying a first sound-source component, from among the plurality of first sound-source components, and a second sound-source component, from among the plurality of second sound-source components, that correspond to each other; identifying a user command based on the first sound-source component and the second sound-source component; and performing an operation corresponding to the user command.

MODE FOR INVENTION

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc., is employed for describing variety of elements, and the terms are used for distinguishing between one element and another element. Therefore, the meanings of the elements are not limited by the terms. The terms are also used just for explaining the corresponding embodiment without limiting the disclosure.

Further, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
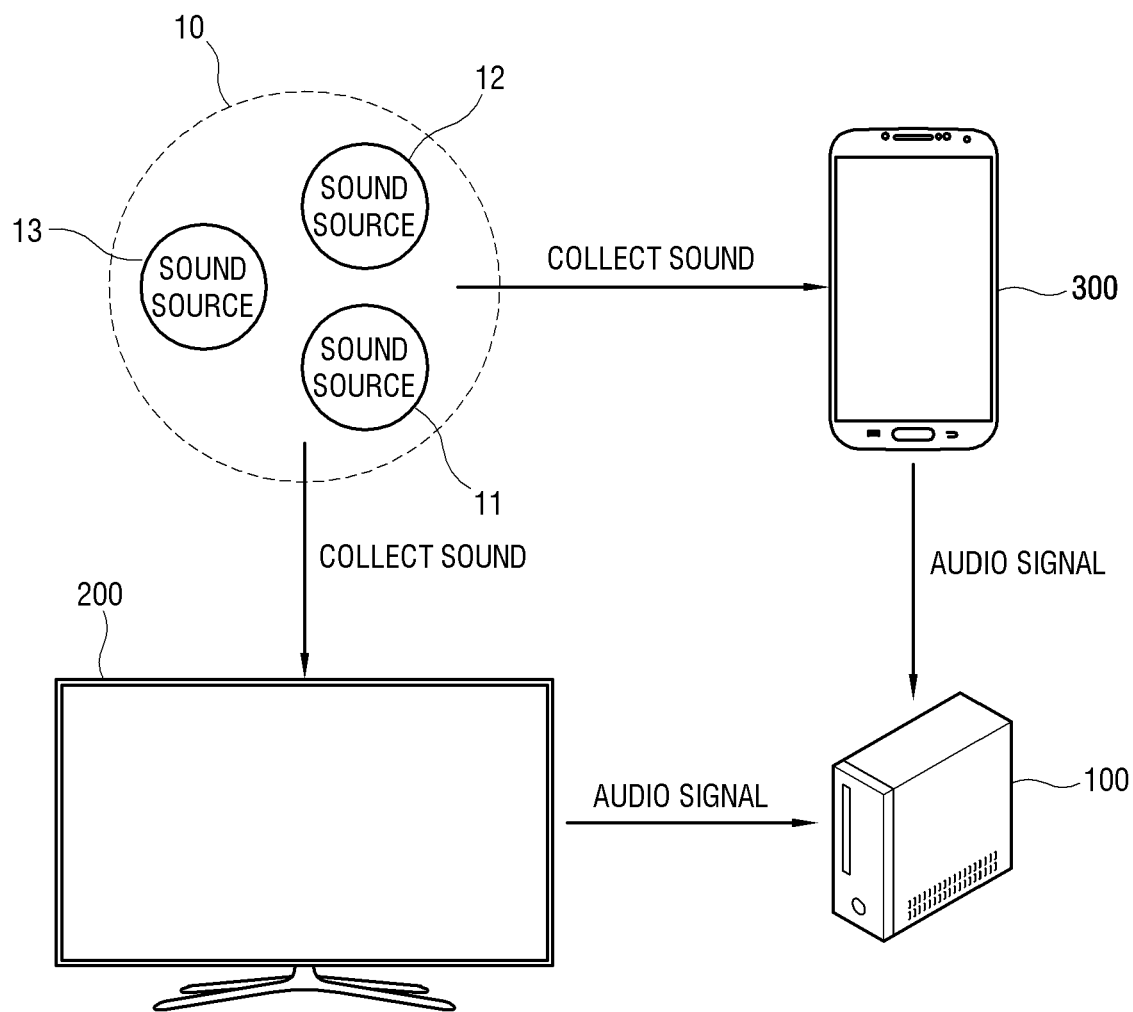
FIG. 1 illustrates an environment where an electronic apparatus recognizes user utterance according to an embodiment.

FIG. 1 illustrates an environment where an electronic apparatus recognizes user utterance according to an embodiment.

As shown in FIG. 1, a system for processing user utterance through speech recognition includes a plurality of devices 200 and 300 to collect sounds of an environment 10 where a user is present. With respect to FIG. 1, it will be described that the plurality of devices 200 and 300 includes a first device 200 and the second device 300. However, this is an example, and there are no limits to the number of devices 200 and 300 capable of collecting sounds in the environment 10. Alternatively, there may be three or more devices capable of collecting sounds. Further, this system includes an electronic apparatus 100 that receives audio signals based on sound collection of the plurality of devices 200 and 300 from the devices 200 and 300, identifies an audio component caused by user utterance, and performs speech recognition for the identified audio component.

Here, Terms "electronic apparatus" 100, "first device" 200 and "second device" 300 are used for convenience to distinguish between the apparatuses or devices, and the terms itself do not limit the features of the apparatuses. For example, the electronic apparatus 100 refers to an apparatus that performs speech recognition, which includes a server, a host apparatus, a master apparatus, etc. When the electronic apparatus 100 is the server, the first device 200 and the second device 300 are embodied as clients that communicate with the electronic apparatus 100. The electronic apparatus 100 may communicate with the first device 200 or the second device 300 through various routes such as a wide area network, a local area network, etc.

As discussed, the electronic apparatus 100 may perform the speech recognition, but embodiments are not limited thereto and the system may be designed without the electronic apparatus 100, and for example, the first device 200 or the second device 300 may perform the speech recognition. For example, when the first device 200 performs the speech recognition, the first device 200 obtains an audio signal collected by itself and an audio signal received from the second device 300.

The electronic apparatus 100, the first device 200 and the second device 300 are not particularly limited, and may include various types of electronic apparatuses or devices. The electronic apparatus 100, the first device 200 and the second device 300 may, for example, be embodied by various apparatuses or devices, such as a television (TV), a monitor, a digital signage, an electronic blackboard, an electronic frame, or similar stationary display apparatus; a set-top box, an optical media player or similar image processing apparatus; a computer or similar information processing apparatus; a smartphone, a tablet device or similar mobile device; a camera, a camcorder or similar image capturing device; a washing machine, a refrigerator, a clothing manager, an air conditioner, an electric cleaner or similar home appliances; a wearable device that is worn on a user's body; a hub, a gateway, a router, an access point (AP) or similar communication device; etc.

The first device 200 and the second device 300 collect sounds in the environment 10 and generate audio signals based on the collected sounds, and transmit the audio signals to the electronic apparatus 100. The electronic apparatus 100 identifies an audio component caused by user utterance in the audio signals received from the first device 200 and the second device 300, and performs speech recognition for the identified audio component. When a user is the only sound source in the environment 10, an audio signal from the first device 200 and an audio signal from the second device 300 may include only the audio components caused by the user utterance. In this case, the electronic apparatus 100 may process the speech recognition for the audio signal from the first device 200 or the audio signal from the second device 300.

On the other hand, a plurality of sound sources 11, 12 and 13, including a user, may be present in the environment 10. Taking this case into account, the first device 200 and the second device 300 collect a sound in a direction where a user utters the sound by a beamforming method to more accurately perform the sound collection for the user utterance. However, even though such a method is used, the audio signals of the sounds respectively collected in the first device 200 and the second device 300 may be mixed with sound-source components caused by a plurality of sound sources 11, 12 and 13. The electronic apparatus 100 identifies an audio component caused by user utterance in the audio signals of sounds respectively collected in the first device 200 and the second device 300, and applies speech recognition to the identified audio component. In this regard, details will be described later.

Below, the configurations of the electronic apparatus 100 and the first device 200 will be described.

Figure 2:
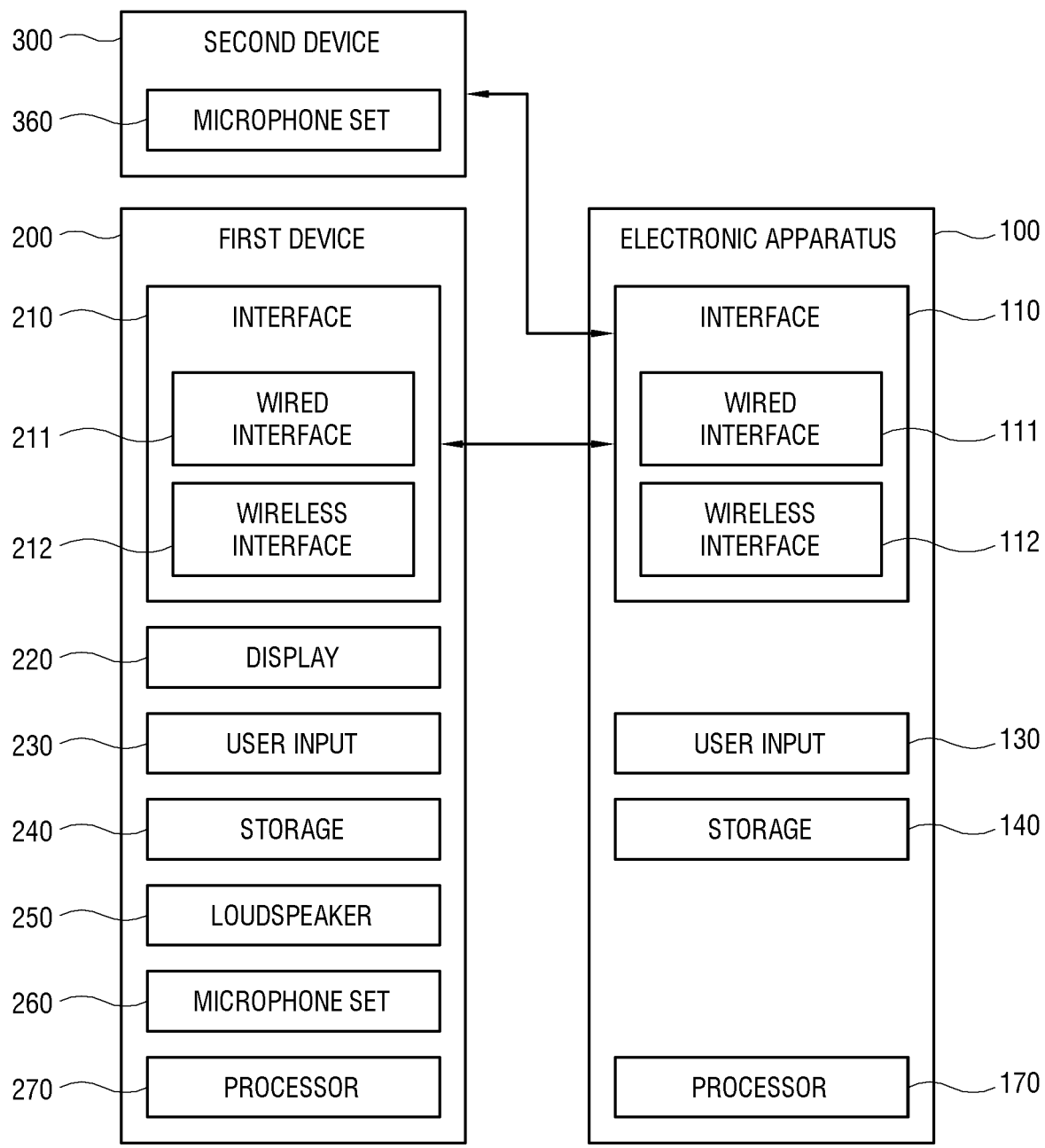
FIG. 2 is a block diagram of an electronic apparatus and a first device according to an embodiment.

FIG. 2 is a block diagram of an electronic apparatus, a first device and a second device according to an embodiment.

As shown in FIG. 2, the electronic apparatus 100 and the first device 200 include various hardware elements for operations. As described above, the electronic apparatus 100 and the first device 200 may be embodied by various kinds of apparatuses, and the following configurations are one of various examples. Further, the second device 300 may include hardware elements similar to the electronic apparatus 100 or the first device 200, and therefore descriptions about the configuration of the second device 300 will be omitted.

The electronic apparatus 100 may include an interface 110. The interface 110 includes an interface circuit through which the electronic apparatus 100 performs communication with external devices, such as the first device 200, and transmits and receives data. The interface 110 may include at least one of one or more a wired interface 111 for wired communication, or a wireless interface 112 for wireless communication.

The wired interface 111 includes a connector or port to which a cable of previously defined transmission standards may be connected. For example, the wired interface 111 includes a port for connecting with a terrestrial or satellite antenna to receive a broadcast signal or connecting with a cable for cable broadcasting. Further, the wired interface 111 may include ports to which cables of various wired transmission standards such as high definition multimedia interface (HDMI), DisplayPort (DP), digital video interactive (DVI), component, composite, S-video, thunderbolt, and the like to connect with various image processing apparatuses. Further, the wired interface 111 may include a port of universal serial bus (USB) standards to connect with a USB device. Further, the wired interface 111 may include an optical port to which an optical cable may be connected. Further, the wired interface 111 may include an audio input port to which an external microphone may be connected, and an audio output port to which a headset, an earphone, a loudspeaker etc., may be connected. Further, the wired interface 111 may include an Ethernet port connected to a gateway, a router, a hub, etc., for connection with the WAN.

The wireless interface 112 includes an interactive communication circuit including at least one of elements such as a communication module, a communication chip, etc., corresponding to various kinds of wireless communication protocols. For example, the wireless interface 112 includes a Wi-Fi communication chip for wireless communication with the AP based on Wi-Fi; a communication chip for wireless communication based on Bluetooth, Zigbee, Z-Wave, Wireless HD, wireless gigabits (WiGig), near field communication (NFC), etc.; an infrared (IR) module for IR communication; a mobile communication chip for mobile communication with a mobile device; etc.

The electronic apparatus 100 may include a user input 130. The user input 130 includes a circuit related to various kinds of user input interfaces to be controlled by a user to thereby receive a user input. The user input 130 may be variously configured according to the kinds of electronic apparatus 100, and may, for example, include a mechanical or electronic button of the electronic apparatus 100, various kinds of sensors, a touch pad, a touch screen installed in the display, etc. Alternatively, the user input 130 may include an external input device such as a keyboard, a mouse, a remote controller, etc., which is separated from the electronic apparatus 100 and connected to the electronic apparatus 100 through the interface 110.

The electronic apparatus 100 may include a storage 140. The storage 140 is configured to store digitalized data. The storage 140 includes a nonvolatile storage in which data is retained regardless of whether power is supplied or not, and a volatile memory in which data loaded to be processed by a processor 170 is retained only when power is supplied. The storage may include a flash memory, a hard disc driver (HDD), a solid-state drive (SSD), a read only memory (ROM), etc., and the memory may include a buffer, a random-access memory (RAM), etc.

The electronic apparatus 100 may include the processor 170. The processor 170 includes one or more hardware processors achieved by a central processing unit (CPU), a chipset, a buffer, a circuit, etc., which are mounted on a printed circuit board (PCB). Alternatively, the processor 170 may be designed as a system on chip (SoC). The processor 170 receives audio signals from the first device 200 and the second device 300 through the interface 110, identifies an audio component caused by user utterance based on operations to be described later, and processes speech recognition.

Here, the speech recognition process may include various subordinate stages, in which the processor 170 may process all such subordinate stages or may share the subordinate stages with other separate apparatuses. For example, the speech recognition process may be divided into a first stage about a speech-to-text (STT) process for converting an audio signal into a text, and a second stage about a semantic analysis process for deriving a command based on content of the text. For example, the first stage may be performed by another apparatus communicating with the electronic apparatus 100 and the second stage may be performed by the processor 170. In other words, the electronic apparatus 100 may autonomously perform both the STT process and the semantic analysis process, or may transmit an audio signal received from the first device 200 to an STT server, receive a text from the STT server, and perform the semantic analysis with regard to the text.

The first device 200 includes various hardware elements. When the first device 200 is a display apparatus, the first device 200 may, for example, include an interface 210 including at least one of a wired interface 211 or a wireless interface 212, a display 220, a user input 230, a storage 240, a loudspeaker 250, a microphone set 260, and a processor 270. The interface 210, the wired interface 211, the wireless interface 212, the user input 230, the storage 240, etc., are equivalent to those of the electronic apparatus 100 described above, and therefore repetitive descriptions will be avoided.

The first device 200 may include the display 220. The display 220 forms a screen for displaying an image based on an image signal processed by the processor 270. The display 220 includes a display panel, and the display panel may be designed to have various structures. For example, the display 220 may include a display panel having a light-receiving structure like liquid crystal, and a backlight unit to illuminate the display panel. Alternatively, the display 220 may include a display panel having a self-emissive structure like an organic light emitting diode (OLED). Alternatively, the display 220 may have a structure forming a large screen with tiling combination of a plurality of micro light emitting diode (LED) modules.

The first device 200 may include the loudspeaker 250. When the processor 270 reproduces predetermined content, the loudspeaker 250 outputs a sound based on an audio signal of the content. The loudspeaker 250 may be installed in the first device 200, or may be provided as a separate apparatus. When the loudspeaker 250 is provided as the separate apparatus, the loudspeaker 250 may be connected to the interface 210, and the audio signal may be transmitted to the loudspeaker 250 through the interface 210.

The first device 200 may include the microphone set 260. The microphone set 260 may generate an audio signal by collecting sounds generated in surrounding environments of the first device 200, and transmit the audio signal to the processor 270. As discussed, the microphone set 260 may be an element separated from the user input 230, but embodiments are not limited thereto, and the microphone set 270 may be included in the user input 230.

As discussed, the microphone set 260 may include a plurality of microphones arranged to be spaced apart from one another, and may thereby perform the beamforming sound collection. For example, when the microphone set 260 detects a trigger word previously set to activate the speech recognition and collects a sound, the processor 270 may strengthen a channel of a sound input in a direction where the trigger word is detected while weakening channels of sounds input in the other directions. Therefore, sound collection may be performed focusing on a user who utters a sound to be input to the microphone set 260. Likewise, the second device 300 also includes a microphone set 360 capable of performing the beamforming sound collection.

Alternatively, the microphone set 260 of the first device 200 or the microphone set 360 of the second device 300 may include a single microphone.

The first device 200 may include the processor 270. The processor 270 includes one or more hardware processors achieved by a CPU, a chipset, a buffer, a circuit, etc., which are mounted on a PCB. Alternatively, the processor 270 may be designed as an SoC. When the first device 200 is a display apparatus, the processor 270 may include modules corresponding to various processes of a demultiplexer, a decoder, a scaler, an audio digital signal processor (DSP), an amplifier, etc., to display an image based on image content. Here, some or all of such modules may be achieved by the SoC. For example, the demultiplexer, the decoder, the scaler, and the like module related to an image process may be achieved as an image processing SoC, and the audio DSP may be achieved as a chipset separated from the SoC. The processor 270 reproduces predetermined content, thereby outputting a sound of the content through the loudspeaker 150 while an image of the content is displayed on the display 120.

The processor 270 may detect a user's utterance collected through the microphone set 260 or the like, and transmit an audio signal of the detected utterance to the electronic apparatus 100 for the speech recognition. When a preset trigger word is not detected in audio of a sound collected by the microphone set 260, the processor 270 may identify that the audio does not include a user utterance. When the trigger word is detected in the audio, the processor 270 may identify an audio component following the trigger word corresponds to the user utterance. In other words, the processor 270 may identify that the audio component subsequent to the trigger word detected in the audios of the sounds collected by the microphone set 260 corresponds to the user utterance, and may transmit an audio signal including the corresponding audio component to the electronic apparatus 100. When a speech recognition result of the audio signal is received from the electronic apparatus 100, the processor 270 may perform an operation instructed by the received speech recognition result.

There are many methods by which the first device 200 collects sounds from surrounding environments. Below, various examples of receiving an audio signal will be described.

Figure 3:
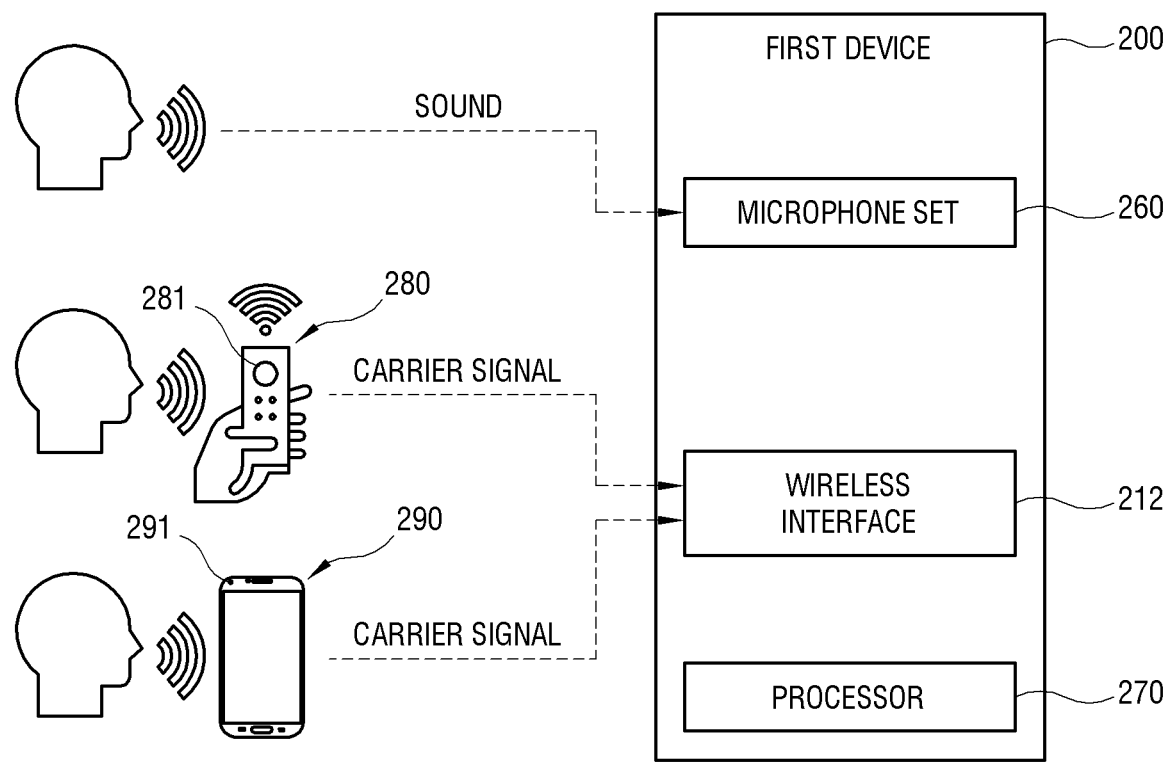
FIG. 3 illustrates various methods by which a first device collects a sound of user utterance according to embodiments.

FIG. 3 shows various methods by which a first device collects a sound of a user's utterance according to embodiments.

Referring to FIGS. 2 and 3, as an example of collecting the user utterance, the first device 200 may collects sounds of surrounding environments through the microphone set 260 provided in the main body of the first device 200. The microphone set 260 may transmit an audio signal based on the collected sounds of the surrounding environments to the processor 270. The microphone set 260 may be activated to always collect the sounds of the surrounding environments. Alternatively, the microphone set 260 may be inactivated (e.g., in a standby mode) in which sound is not collected, and then activated to collect a sound when a specific condition is satisfied. Such a condition may be variously designed. For example, the condition may be satisfied when a level of noise generated in the surrounding environments exceeds a predetermined threshold. For example, the microphone set 260 may be activated and inactivated according to a user's input.

As another example of collecting the user utterance, a remote controller 280 provided separately from the first device 200 may include a microphone set 281, and may collect sounds of surrounding environments through the microphone set 281. Usually, the remote controller 280 is more likely to be placed close to a user, and therefore the microphone set 281 provided in the remote controller 280 may be more likely to clearly collect a user's utterance than the microphone set 260 installed in the main body of the first device 200. The remote controller 280 may convert an audio signal of a sound collected through the microphone set 281 into a carrier signal based on predetermined transmission standards, and transmit the carrier signal to the wireless interface 212. The carrier signal received in the wireless interface 212 may be converted into an audio signal, and the audio signal may be provided to the processor 270.

The method of activating and inactivating the microphone set 281 may be variously designed. The remote controller 280 may operate using a built-in battery without being connected to an external power source, and therefore there may be an issue with a power efficiency in that the microphone set 281 is always activated.

For example, the remote controller 280 may include a toggle button for selectively activating the microphone set 281. A user may control the toggle button so that the remote controller 280 can activate or inactivate the microphone 281. For example, the remote controller 280 may activate the microphone set 281 while the toggle button is depressed. For example, the remote controller 280 may switch the microphone set 281 between an activate state and an inactive state each time the toggle button is depressed.

Alternatively, like the foregoing microphone set 260 provided in the first device 200, the remote controller 280 may control whether to activate the microphone set 281. For example, the microphone set 281 may be inactivated (e.g., in a standby mode) in which sound is not collected, and then activated to collect a sound when a specific condition that a level of noise generated in surrounding environments exceeds a predetermined threshold is satisfied.

Alternatively, as another example of collecting the user utterance, when a mobile device 290 such as a smartphone or a tablet device includes a microphone set 291, a sound of surrounding environments may be collected through the microphone set 291. The mobile device 290 may perform an operation related to the first device 200 by installing software related to the first device 200. For example, when the first device 200 is a TV, a dedicated application for controlling the TV may be installed on the mobile device 290, and the mobile device 290 may transmit an audio signal of a sound collected through the microphone set 291 to the first device 200 under the condition that the corresponding application operates. The mobile device 290 may convert the audio signal into a carrier signal, and wirelessly transmit the carrier signal to the wireless interface 212. The carrier signal received in the wireless interface 212 may be converted into the audio signal, and then transmitted to the processor 270.

Thus, the first device 200 may obtain an audio signal corresponding to a sound of surrounding environments by various methods. When a preset command is detected within the obtained audio signal, the processor 270 may identify an audio component, which is obtained after the time of the preset command, as a target for the speech recognition. The preset command refers to a word or sentence previously set to previously inform the first device 200 that a user will utter a command, and may include any content as long as it can be uttered by a user with his/her speech. For example, the preset command may include one or more words.

Here, the microphone sets 260, 281 and 291 are provided to perform the beamforming sound collection by the method described above.

However, the audio signal obtained by the first device 200 through the beamforming-based microphone sets 260, 281 and 291 may include audio components of other sounds not uttered by a user as well as an audio component uttered by the user. For example, when there are sound sources other than a user in beamforming directions of the microphone sets 260, 281 and 291, the audio signal includes the audio component caused by the user utterance and audio components of other sound sources. In this case, the electronic apparatus 100 may perform speech recognition by identifying the audio component caused by the user utterance. Below, such an embodiment will be described.

Figure 4:
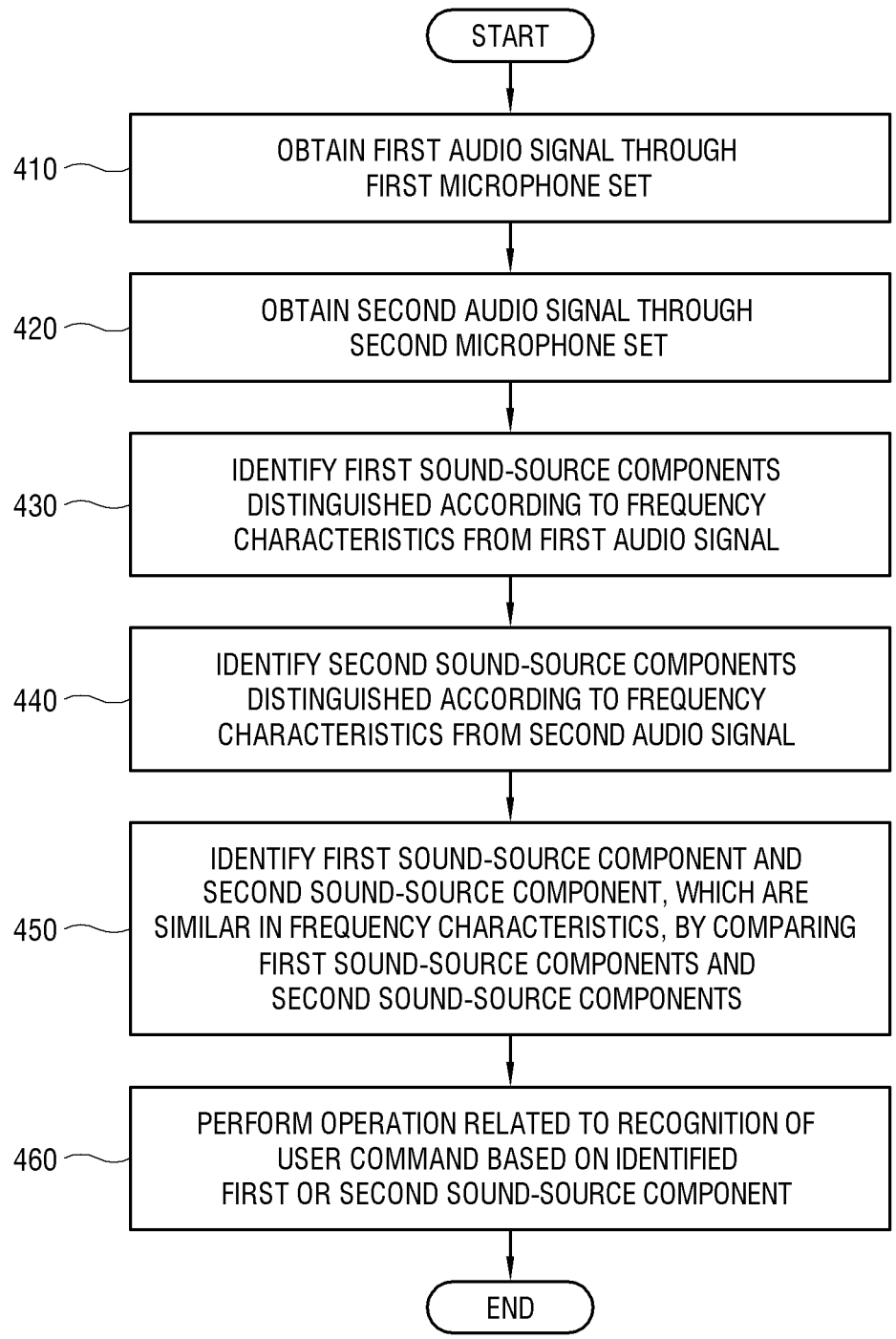
FIG. 4 is a flowchart showing a method of controlling an electronic apparatus according to an embodiment.

FIG. 4 is a flowchart showing a method of controlling an electronic apparatus according to an embodiment.

As shown in FIGS. 2 and 4, the following operations are performed by the processor 170 of the electronic apparatus 100.

At operation 410 the electronic apparatus 100 obtains a first audio signal through the first microphone set 260 of the first device 200.

At operation 420 the electronic apparatus 100 obtains a second audio signal through the second microphone set 360 of the second device 300. Here, the first microphone set 260 and the second microphone set 360 perform the sound collection by the beamforming method in response to the user utterance. The electronic apparatus 100 receives the first audio signal and the second audio signal from the first device 200 and the second device 300, respectively.

At operation 430 the electronic apparatus 100 identifies a plurality of first sound-source components, which are distinguished from one another according to frequency characteristics, from the first audio signal.

At operation 440 the electronic apparatus 100 identifies a plurality of second sound-source components, which are distinguished from one another according to frequency characteristics, from the second audio signal.

At operation 450 the electronic apparatus 100 identifies a first sound-source component and a second sound-source component, which are similar in the frequency characteristics, based on a comparison between the plurality of first sound-source components and the plurality of second sound-source components.

At operation 460 the electronic apparatus 100 performs an operation corresponding to a user command based on the identified first sound-source component and the identified second sound-source component. Because the identified first and second sound-source components are the sound-source components caused by the user utterance, the electronic apparatus 100 performs the speech recognition with regard to the identified first and second sound-source components, and performs an operation based on a speech recognition processing result.

Thus, the electronic apparatus 100 identifies a sound-source component caused by user utterance among a plurality of sound sources in an audio signal based on sound collection when there is a plurality of sound sources in a sound collection environment.

The electronic apparatus 100 performs the beamforming sound collection through the first microphone set 260 and the second microphone set 360, each of which includes a plurality of microphones. However, embodiments are not limited thereto. For example, the first microphone set 260 or the second microphone set 360 may be designed to include a single microphone. For example, the first microphone set 260 or the second microphone set 360 may be the single microphone based on the beamforming method. Alternatively, when the first microphone set 260 and the second microphone set 360 are physically spaced apart from each other even though the first microphone set 260 and the second microphone set 360 are not based on the beamforming method, the sound-source components included in the first audio signal and the second audio signal may be different in characteristics (e.g. the number of sound-source components, the channel strengths of the sound-source component, etc.). Therefore, the foregoing operations of the electronic apparatus 100 may be used when the first microphone set 260 or the second microphone set 360 supports the beamforming method, and also when the first microphone set 260 or the second microphone set 360 does not support the beamforming method.

The processor 170 of the electronic apparatus 100 may perform at least a part of data analysis, data process and result information generation based on at least one of machine learning, a neural network, deep learning algorithms, or as a rule-based or artificial intelligence (AI) algorithm in order to identify the plurality of first sound-source components in the first audio signal, identify the plurality of second sound-source components in the second audio signal, and identify the first sound-source component and the second sound-source component, which are similar in frequency characteristics, based on the plurality of first sound-source components and the plurality of second sound-source components as described above.

For example, the processor 170 of the electronic apparatus 100 may function as a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage of the electronic apparatus 100 or from the outside. The learning data may be data used for learning the neural network, and the data subjected to the foregoing operations may be used as the learning data for learning of the neural network.

Before learning of the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network which is set to perform the operations.

The learned neural network may include a plurality of neural networks (or layers). The nodes of the plurality of neural networks have weighted values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

The recognizer may obtain target data to carry out the foregoing operations. The target data may be obtained from the storage of the electronic apparatus 100 or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

The electronic apparatus 100 may perform various operations related to the speech recognition, such as automatic speech recognition (ASR), natural language understanding (NLU), etc., based on the first sound-source component or the second sound-source component identified in the operation 460. The ASR refers to an operation of converting content of audio signal caused by user utterance into a text, which includes an STT operation. Further, the ASR may include an operation of identifying a control command corresponding to the text of the audio signal, in a database (DB) of the preset control command. The NLU includes an operation of converting content uttered by a user into a machine-readable language, when the content is given as an expression of a natural language.

The electronic apparatus 100 may perform various operations related to the ASR, the NLU, etc. For example, an identified audio including an identified first sound-source component or an identified second sound-source component (in other words, audio of a sound-source component identified as uttered by a user) may be converted into a text. The electronic apparatus 100 may transmit an identified audio to the STT server for the STT and receive a text of the audio from the STT server, or may obtain the text of the audio through its own STT engine. To this end, an utterance recognition model may be provided in the electronic apparatus 100 or the STT server. The utterance recognition model may include an acoustic model and a language model. For example, the acoustic model may include information about vocalization, and the language model may include information about unit phonemic information and combination of the unit phonemic information. The utterance recognition model may use information about vocalization and unit phonemic information to convert user utterance into text data. The acoustic model and the language model may be embodied by an automatic speech recognition AI model.

Alternatively, the electronic apparatus 100 may analyze a natural language text of obtained audio through its own NLU model, identify a command based on an analyzed result, and perform an operation corresponding to the identified command. Alternatively, the electronic apparatus 100 may transmit a text to a natural language processing server using the NLU model, and receive a command as a result of processing the text from the natural language processing server. The NLU may perform syntactic analysis or semantic analysis to identify a user's intention. In the syntactic analysis, a user input is parsed into grammatical units (e.g., words, phrases, morphemes, etc.), and it is understood what syntactic element the parsed unit has. The semantic analysis is performed based on sematic matching, rule matching, formula matching, etc. Therefore, the NLU model estimates a context of a sentence based on combination of the syntactic analysis and the semantic analysis (for example, meanings of words in a sentence are recognized by the syntactic analysis, and intention matching the meanings of these words is found out by the semantic analysis, thereby understanding the meaning of the sentence).

Alternatively, the electronic apparatus 100 may receive the first audio signal and the second audio signal and identify the sound-source component, but operations for the speech recognition may be performed by a speech recognition server provided separately from the electronic apparatus 100. In this case, the operations 410 to 450 among the above operations are equivalent to those of the foregoing embodiment. At operation 460, the electronic apparatus 100 transmits the audio signal of the identified first or second sound-source component to the speech recognition server. The speech recognition server performs a speech recognition process for the audio signal received from the electronic apparatus 100, and transmits a speech-recognition processing result to the electronic apparatus 100. Thus, the electronic apparatus 100 performs an operation based on the speech-recognition processing result received from the speech recognition server.

According to embodiments, the electronic apparatus 100 may be omitted from the system, and the first device 200 may replace the role of the electronic apparatus 100. In this case, operations will be described below.

At operation 410 the first device 200 obtains a first audio signal through the first microphone set 260.

At operation 420 the first device 200 obtains a second audio signal through the second microphone set 360 of the second device 300. The first device 200 receives a second audio signal from the second device 300.

At operation 430 the first device 200 identifies a plurality of first sound-source components, which are distinguished from one another according to frequency characteristics, from the first audio signal.

At operation 440 the first device 200 identifies a plurality of second sound-source components, which are distinguished from one another according to frequency characteristics, from the second audio signal.

At operation 450 the first device 200 identifies a first sound-source component and a second sound-source component, which are similar in the frequency characteristics, based on a comparison between the plurality of first sound-source components and the plurality of second sound-source components.

At operation 460 the first device 200 performs an operation corresponding to a user command based on the identified first sound-source component and the identified second sound-source component. When the first device 200 is provided to autonomously perform the speech recognition process, the first device 200 performs a speech recognition process for the identified first or sound-source component. Alternatively, when the first device 200 communicates with the speech recognition server, the first device 200 transmits the audio signal of the identified first or second sound-source component to the speech recognition server and receive a speech-recognition process result from the server.

Below, it will be described in more detail that the speech recognition process is performed under an environment where there is a plurality of devices 200 and 300.

Figure 5:
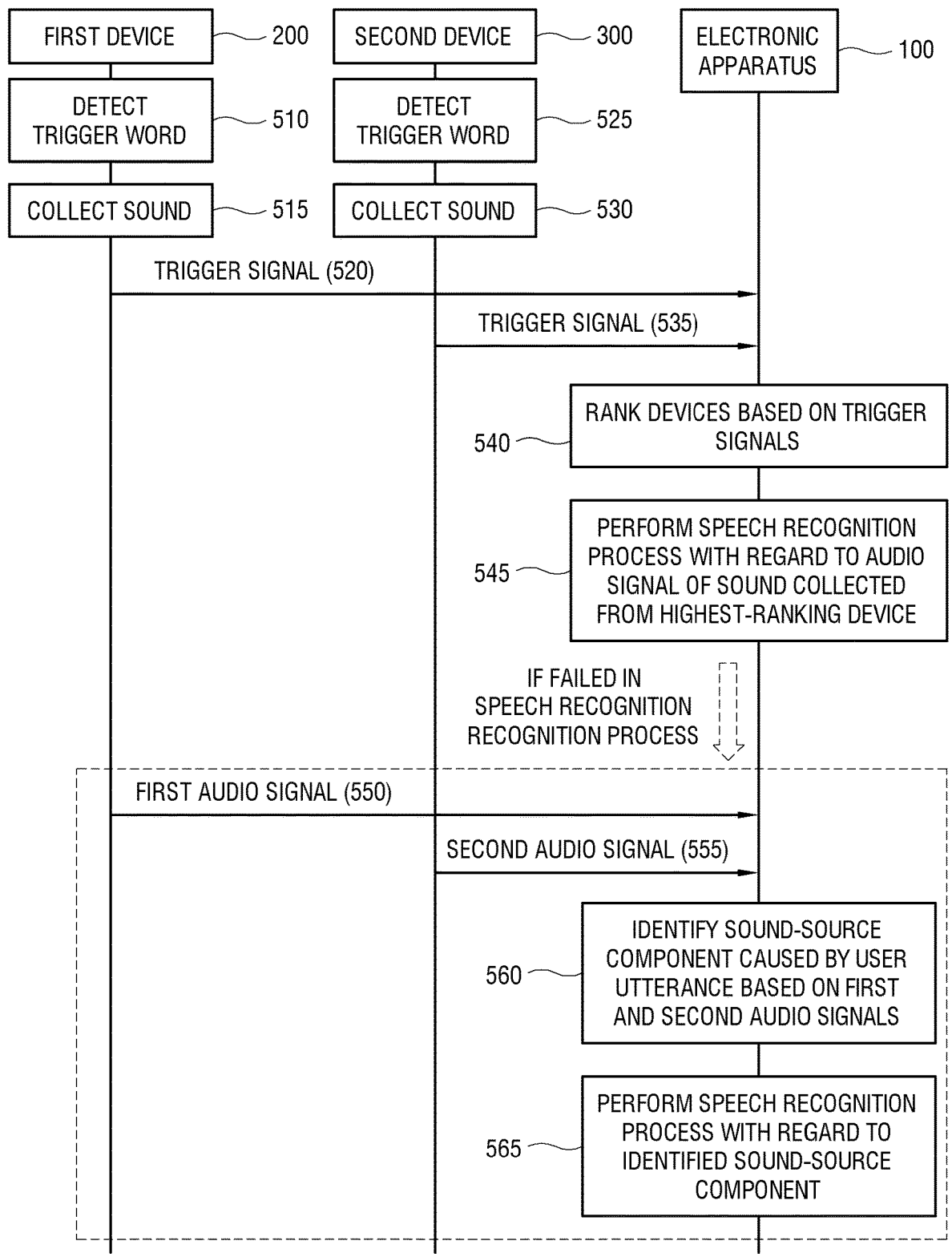
FIG. 5 illustrates a process in which an electronic apparatus applies speech recognition to an audio signal from one device among a plurality of devices according to an embodiment.

FIG. 5 illustrates a process in which an electronic apparatus applies speech recognition to an audio signal from one device among a plurality of devices according to an embodiment.

As shown in FIGS. 4 and 5, the first device 200 detects a trigger word uttered by a user (510). The first device 200 collects a sound of the trigger word as the trigger word is detected (515), and transmits a trigger signal including audio based on the sound collection to the electronic apparatus 100 (520).

Like the first device 200, the second device 300 detects the trigger word uttered by the user (525). The first device 200 collects the sound of the trigger word as the trigger word is detected (530), and transmits a trigger signal including audio based on the sound collection to the electronic apparatus 100 (S535). Although only the first device 200 and the second device 300 are described, embodiments are not limited thereto and corresponding features but may be equivalently applied to a case where there are three or more devices.

The electronic apparatus 100 ranks the devices 200 and 300 in order of recognition similarity of the trigger word, based on the trigger signal from the first device 200 and the trigger signal from the second device 300 (540). This ranking is based on a degree to which the audio of the sound collected in each of the devices 200 and 300 matches the trigger word, and the electronic apparatus 100 identifies the ranking based on the sound-collection audios of the trigger word from the devices 200 and 300. In other words, this ranking refers to a ranking that indicates the reliability of the sound collection in each microphone set of the devices 200 and 300.

For example, the electronic apparatus 100 identifies similarities by comparing the sound-collection audios of the trigger word from the devices 200 and 300 with an audio profile of the trigger word, and ranks the devices 200 and 300 based on these similarities. As discussed, the devices 200 and 300 may be ranked because the devices 200 and 300 include the microphone sets. However, embodiments are not limited thereto and the microphone sets may be ranked, or each of the trigger signals (or audios) may be ranked.

The electronic apparatus 100 receives an audio signal of a sound collection from the highest-ranking device 200 or 300, and performs the speech recognition process (545). For example, when the first device 200 is given the highest-ranking, the electronic apparatus 100 receives an audio signal of a sound, which is collected after the trigger ward is detected, from the first device 200. The electronic apparatus 100 may request the first device 200 to transmit the audio signal or receive the audio signal from the first device 200 without the request.

When the speech recognition process is successfully performed in the operation 545, the speech-recognition processing result is carried out and this process is terminated. On the other hand, the speech recognition process performed in the operation 545 may fail. In this case, the electronic apparatus 100 performs operations (550, 555, 560, 565), which correspond to the processes of FIG. 4.

The electronic apparatus 100 receives a plurality of audio signals from the plurality of devices 200 and 300 (550, 555), respectively. The electronic apparatus 100 receives a first audio signal of sound collection from the first device 200 (550, corresponding to the operation 410 of FIG. 4), and receives a second audio signal of sound collection from the second device 300 (555, corresponding to the operation 420 of FIG. 4). The first device 200 generates the first audio signal by collecting a sound after the trigger word is detected, and the second device 300 generates the second audio signal by collecting a sound after the trigger word is detected.

Here, there may be various methods by which the electronic apparatus 100 selects which of the plurality of devices 200 and 300 to receive an audio signal from. For example, the electronic apparatus 100 may select to receive an audio signal from each of the devices that transmit the trigger signals (520, 535). Alternatively, the electronic apparatus 100 may select to receive an audio signal from only some devices, for example those which are ranked relatively high in recognition of the trigger word, among all the devices that transmit the trigger signals (520, 535).

According to an embodiment, the first device 200 and the second device 300 may be selected according to the rankings, and then the first device 200 and the second device 300 collect a sound of user utterance and respectively transmit the first audio signal and the second audio signal. In this case, for example, it may be difficult for the first device 200 to normally collect a sound of user utterance, and the first audio signal may not be normally generated. Although the first audio signal is generated, it may be difficult for the electronic apparatus 100 to analyze the first audio signal.

In this case, the electronic apparatus 100 may exclude the first device 200 from devices to be analyzed, select the highest-ranking device among the other unselected devices, and receive an audio signal from the selected device. In this case, the electronic apparatus 100 makes the first device 200 to display thereon a user interface (UI) which indicates that normal speech recognition is not performed. When the first device 200 does not include a display (for example, a loudspeaker), a user may be informed by various methods, such as a method of outputting the foregoing content through the loudspeaker.

The electronic apparatus 100 identifies a sound-source component caused by user utterance, based on the first audio signal and the second audio signal (560, corresponding to the operations 430 to 450 of FIG. 4). The electronic apparatus 100 performs the speech recognition process with regard to the identified sound-source component (565, corresponding to the operation 460 of FIG. 4). As discussed, the operations 550 to 565 are carried out when the operation 545 is not normally performed. However, embodiments are not limited thereto and the operations 550 to 565 may be designed to be performed directly after the operation 540. In other words, the plurality of devices 200 and 300 are selected based on the rankings after the devices 200 and 300 are ranked in the recognition of the trigger word, and then the operations 550 to 565 may be performed.

Below, a concrete method by which the electronic apparatus 100 identifies a sound-source component caused by user utterance based on a first audio signal and a second audio signal will be described.

Figure 6:
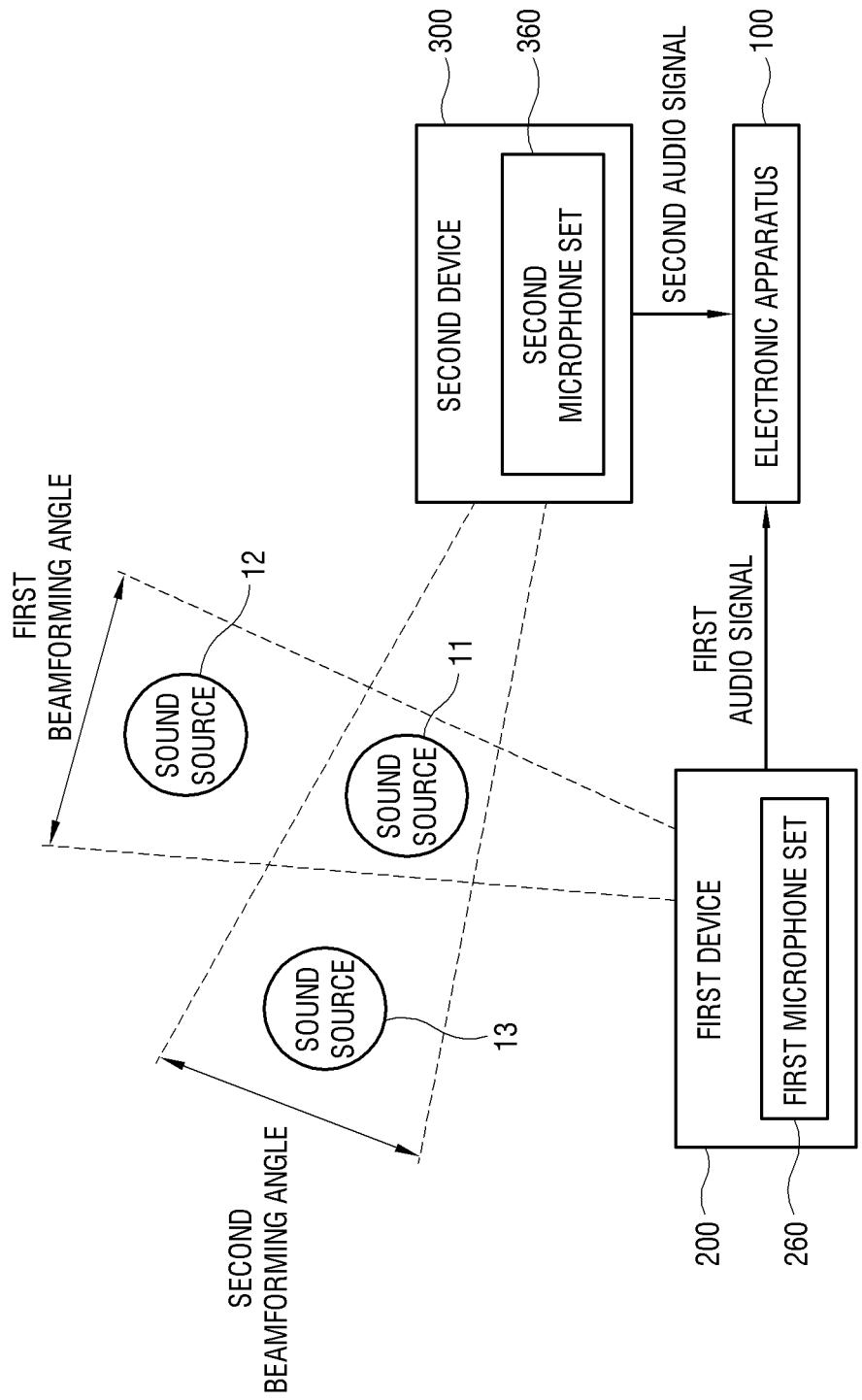
FIG. 6 illustrates a case in which a plurality of devices performs beamforming sound collection in an environment where there is a plurality of sound sources according to an embodiment.

FIG. 6 illustrates a case in which a plurality of devices performs beamforming sound collection in an environment where there is a plurality of sound sources according to an embodiment.

As shown in FIG. 6, a plurality of sound sources 11, 12 and 13 is present in a sound collection environment. For example, the first sound source 11 may utter a trigger word. The first device 200 may perform the beamforming sound collection in a direction toward the first sound source 11, in which the utterance of the trigger word is detected, through the first microphone set 260. Likewise, the second device 300 may perform the beamforming sound collection in a direction toward the first sound source 11, in which the utterance of the trigger word is detected, through the second microphone set 360. The first audio signal subjected to the beamforming sound collection of the first microphone set 260 includes the sound-source components of all the sound sources 11 and 12 within a first beamforming angle. The second audio signal subjected to the beamforming sound collection of the second microphone set 360 includes the sound-source components of all the sound sources 11 and 13 within a second beamforming angle.

Because the beamforming collects sounds in a direction where the trigger word is detected, it may be estimated that the sound-source component is caused by user utterance when the audio signal of the collected sound includes only one sound-source component. On the other hand, when the plurality of sound sources 11, 12 and 13 are present within the beamforming angle, the audio signal of the collected sound includes the plurality of sound-source components. In this case, the electronic apparatus 100 receives audio signals of sounds collected in different beamforming directions from the first device 200 and the second device 300 (e.g., the first audio signal from the first device 200 and the second audio signal from the second device 300), and identifies the sound-source component of the user utterance based on the received audio signals. Below, this identification method will be described in more detail.

For example, the first audio signal and the second audio signal may be divided into sound-source components of the plurality of sound sources 11, 12 and 13 through source separation. There are various methods to perform the source separation. As an example, complex non-negative matrix factorization (NMF) may be used. This method refers to an algorithm where a matrix V having no negative elements is factorized into the product of two matrices W and H having no negative elements. This non-negativity makes the resulting matrices easier to inspect. An audio signal has two characteristics in a time domain and a frequency domain. Based on the complex NMF, an audio signal V represented as the matrix is factorized into the matrix H in the time domain and the matrix W in the frequency domain.

Figure 7:
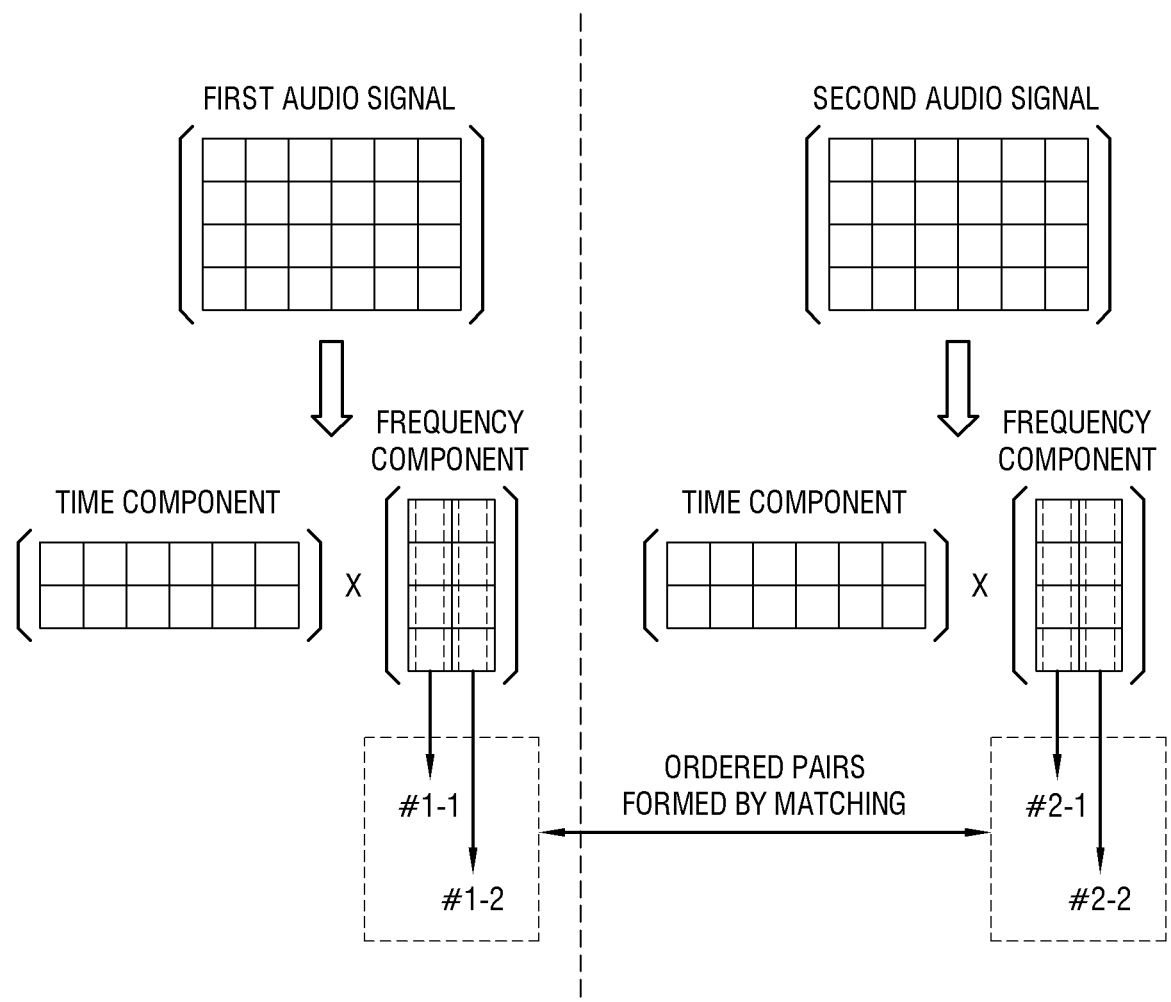
FIG. 7 illustrates extraction of frequency components corresponding to sound sources from a first audio signal and a second audio signal and matching them to each other according to an embodiment.

FIG. 7 illustrates extraction of frequency components corresponding to sound sources from a first audio signal and a second audio signal and matching them to each other according to an embodiment.

As shown in FIGS. 6 and 7, the first audio signal of the sound collected by the first device 200 may be represented as a two-dimensional matrix in the time domain and the frequency domain. Based on the complex NMF, the audio signal of the sound collected in one device 200 or 300 may be represented as follows.

$$|x_{ij}|^2 = \Sigma(t_{ik} * v_{kj})$$

In the above expression, "k" is the number of sound sources in the audio signal, which has an initial value of "1" and a last value of a predetermined natural number, i.e., "k". "i" represents a frequency band, and "j" represents a time range. "$t_{ik}$" represents a frequency component of a sound source, and "$v_{jk}$" represents a time component of a sound source. In other words, the above expression shows that the audio signal of the sound collected in one device 200 and 300 is decomposed into frequency components corresponding to the sound sources and time components corresponding to the sound sources.

Therefore, the electronic apparatus 100 may extract frequency components corresponding to the sound sources 11 and 13 from the first audio signal. When the first audio signal corresponds to the first sound source 11 and the second sound source 12, the frequency component #1-1 of the first sound source 11 and the frequency component #1-2 of the second sound source 12 are extracted from the first audio signal. Likewise, the frequency component #2-1 of the first sound source 11 and the frequency component #2-2 of the third sound source 13 may be extracted from the second audio signal corresponding to the first sound source 11 and the third sound source 13.

The number of frequency components extracted from one audio signal corresponds to the number of sound sources 11, 12 and 13 corresponding to the audio signal. In other words, N frequency components may be extracted from the audio signal of the sound collected from N sound sources 11, 12 and 13 by one device 200 or 300.

The electronic apparatus 100 may match the plurality of frequency component #1-1 and #1-2 extracted from the first audio signal and the plurality of frequency components #2-1 and #2-2 extracted from the second audio signal, thereby forming ordered pairs. When N frequency components extracted from the first audio signal and M frequency components extracted from the second audio signal are matched to form ordered pairs (where, N and M are natural numbers), N*M ordered pairs of frequency components may be formed by two devices 200 and 300. In this example, a total of 2*2=4, i.e., [#1-1 & #2-1], [#1-1 & #2-2], [#1-2 & #2-1] and [#1-2 & #2-2] are extracted.

The electronic apparatus 100 may calculate a similarity between frequency components in each ordered pair. There are many methods of calculating the similarity. For example, the similarity may be calculated based on a Euclidean distance. The Euclidean distance is a mathematical method of calculating the similarity between data or signals. For example, when two pieces of data to be subjected to comparison are represented as coordinates on a Euclidean plane, the Euclidean distance indicates a distance between the two coordinates. The shorter the Euclidean distance between the coordinates of two pieces of data, the higher the similarity between two pieces of data. The longer the Euclidean distance between the coordinates of two pieces of data, the lower the similarity between two pieces of data.

The electronic apparatus 100 may identify an ordered pair having the highest similarity between frequency components. The high similarity between the two frequency components indicates that these frequency components are caused by one sound source 11. When it is taken into account that the first device 200 and the second device 300 detect the same user utterance and perform the sound collection with respect to the detected user utterance but the beamforming direction of the first device 200 is different from the beamforming direction of the second device 300, it is expected that the ordered pair having the highest similarity between the frequency component is caused by the user utterance. In other words, the electronic apparatus 100 identifies that the identified ordered pairs correspond to the user utterance.

The electronic apparatus 100 may restore audio from the frequency components of the identified ordered pair (e.g., [#1-1 & #2-1]), and perform the speech recognition process with respect to the restored audio. Thus, the electronic apparatus 100 may identify audio corresponding to user utterance from a plurality of audio signals subjected to the beamforming sound collection by the plurality of devices 200 and 300, and may perform the speech recognition process with regard to the identified audio.

There may be a time difference between the first audio signal of the sound collected by the first device 200 and the second audio signal of the sound collected by the second device 300 with respect to one sound-source component because the sound collection is performed by the different devices 200 and 300. In this case, the electronic apparatus 100 may use various methods to correct the time difference and synchronize the first and second signals. As an example, an interval from a time when the first device 200 detects the trigger word to a time when the first device 200 starts the sound collection for generating the first audio signal may be different from an interval from a time when the second device 300 detects the trigger word to a time when the second device 300 starts the sound collection for generating the second audio signal. The electronic apparatus 100 may adjust synchronization between the first audio signal and the second audio signal based on such difference between the time intervals. If the difference is below a time difference threshold, the difference may be too small to affect the identification when the speed at which sound travels in air and processing speeds of the devices 200 and 300 are taken into account. In this case, the electronic apparatus 100 may determine whether the difference is below the time difference threshold, and may perform the identification without an additional synchronization operation when the difference is below the time difference threshold.

As discussed, there may be two devices 200 and 300 and the audio signal of the sound collected by each of the devices 200 and 300 includes two sound-source components. However, embodiments are not limited thereto and according to the sound collection environments, three or more devices 200 and 300 perform the sound collection, and the audio signal of the sound collected by each of the devices 200 and 300 may include three or more sound-source components.

For example, it will be assumed that S devices (where, S is a natural number) generate an audio signal based on sound collection in a sound collection environment. The frequency components included in each audio signal are as follows.

First audio signal: [#1-1, #1-2, . . . , #1-P],
Second audio signal: [#2-1, #2-2, . . . , #2-Q],
Third audio signal: [#3-1, #3-2, . . . , #3-R], . . .
$S^{th}$ audio signal: [#S-1, #S-2, . . . , #S-T]

Where, P, Q, R, S and T are natural numbers. P is the number of sound sources from which sounds are collected by the first device, Q is the number of sound sources from which sounds are collected by the second device, R is the number of sound sources from which sounds are collected by the third device, and T is the number of sound sources from which sounds are collected by the $S^{th}$ device. The ordered pairs are formed by matching the frequency components of such S audio signals. In this case, the number of ordered pairs is obtained by multiplying all the frequency components of the audio signals (i.e., P*Q*R* . . . *T).

For example, it will be assumed as follows that each of three audio signals includes two frequency components.

First audio signal: [#1-1, #1-2],
Second audio signal: [#2-1, #2-2],
Third audio signal: [#3-1, #3-2]

In this case, eight ordered pairs of [#1-1, #2-1, #3-1], [#1-1, #2-1, #3-2], [#1-1, #2-2, #3-1], [#1-1, #2-2, #3-2], [#1-2, #2-1, #3-1], [#1-2, #2-1, #3-2], [#1-2, #2-2, #3-1], [#1-2, #2-2, #3-2] are formed.

The electronic apparatus 100 identifies an ordered pair having the highest similarity between the frequency components, among such ordered pairs. The identification method is the same as described above in the foregoing embodiment.

The electronic apparatus 100 may select the frequency components under a predetermined condition before forming the ordered pairs based on the plurality of frequency components extracted from the plurality of audio signals. For example, when a time component extracted from the audio signal is constant without change, the electronic apparatus 100 may exclude a frequency component corresponding to this time component. The constant time component is highly likely to be an environmental noise.

The electronic apparatus 100 may give weight under a predetermined condition when the similarity between the frequency components in the ordered pairs is calculated. For example, the electronic apparatus 100 gives weight to the frequency components corresponding to a voice band (e.g., 100 Hz to 2 kHz).

The foregoing describes a system where the sound collection is performed through a plurality of devices 200 and 300 disposed in different positions. However, the disclosure is not limited to such a system, but may be applied to one device. Below, such an embodiment will be described.

Figure 8:
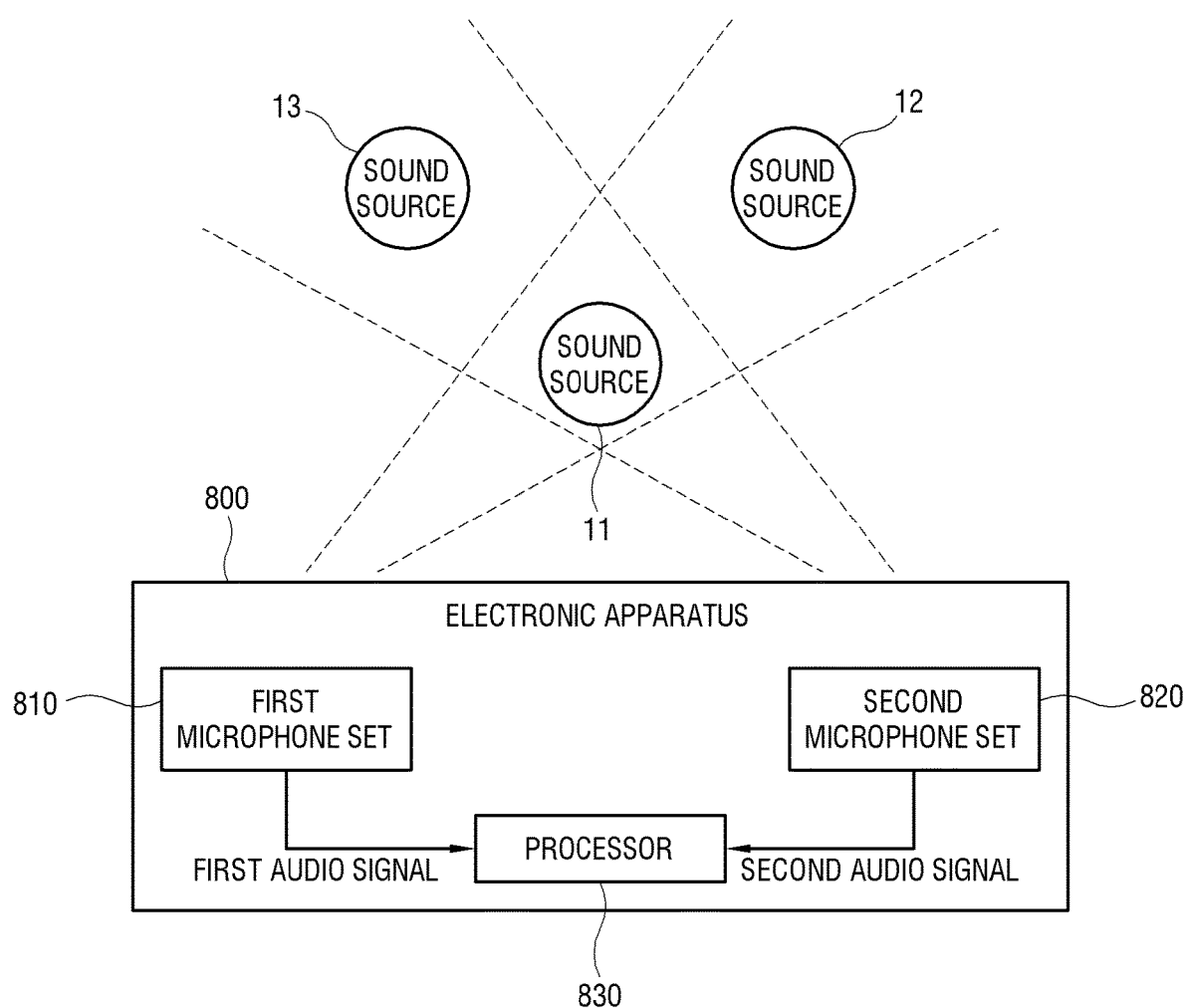
FIG. 8 illustrates an electronic apparatus which performs beamforming sound collection in an environment where there is a plurality of sound sources according to an embodiment.

FIG. 8 illustrates an electronic apparatus which performs beamforming sound collection in an environment where there is a plurality of sound sources according to an embodiment.

As shown in FIG. 8, an electronic apparatus 800 includes a first microphone set 810 and a second microphone set 820. The first microphone set 810 and the second microphone set 820 are provided to perform the beamforming, and are spaced apart from each other. When there is a plurality of sound sources 11, 12 and 13 in a sound collection environment, the first microphone set 810 may transmit a first audio signal based on sounds collected from the plurality of sound sources 11 and 12 to a processor 830, and the second microphone set 820 may transmit a second audio signal based on sounds collected from the plurality of sound sources 11 and 13 to the processor 830. The processor 830 may apply a beamforming algorithm as described above to the received first and second audio signals.

The processor 830 identifies audio caused by user utterance based on the first audio signal and the second audio signal to which the beamforming is applied. Descriptions in this regard will be omitted because they are the same as those in the foregoing embodiment. Further, the electronic apparatus 800 is not limited to the two microphone sets 810 and 820, but may include three or more microphone sets.

The processor 830 may perform a speech recognition process with regard to the identified audio caused by user utterance. Alternatively, the processor may transmit the audio to a speech recognition server and receive a speech-recognition processing result of the audio from the speech recognition server.

The operations of the apparatus described in the foregoing embodiments may be implemented by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning technology and algorithms based on an algorithm of autonomously classifying and learning features of input data, and copying perception, identification and the like functions of a human brain The elementary technology may, for example, include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved under control of a program instruction that can be implemented in various computers, and recorded in a computer readable medium. Such a computer readable medium may include a program instruction, a data file, a data structure or the like, or a combination thereof. For example, the computer readable medium may be stored in a nonvolatile storage such as universal serial bus (USB) memory, regardless of whether it is deletable or rewritable, for example, a RAM, a ROM, a flash memory, a memory chip, an integrated circuit (IC) or similar memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program instruction recorded in this storage medium may be specially designed and configured according to the embodiments, or may be publicly known and available to those skilled in the art of computer software. Further, the computer program instruction may be implemented by a computer program product.

While embodiments have been particularly shown and described, it will be understood that various changes in form and details may be made therein without departing from the spirit and scope of the following claims.

What is claimed is:

1. An electronic apparatus comprising:
   an interface configured to receive a first audio signal from a first microphone set and receive a second audio signal from a second microphone set provided at a position different from that of the first microphone set;
   a processor configured to:
   obtain a plurality of first sound-source components based on the first audio signal and a plurality of second sound-source components based on the second audio signal, the plurality of first sound-source components comprising a plurality of first audio signal frequency components and the plurality of second sound-source components comprising a plurality of second audio signal frequency components;
   identify a first sound-source component, from among the plurality of first sound-source components and identify a second sound-source component from among the plurality of second sound-source components, by comparing each of the plurality of first sound-source components with each of the plurality of second sound-source components, wherein the identified first sound-source component and the identified second sound-source component correspond to each other;
   identify a user command based on the first sound-source component and the second sound-source component; and
   control an operation corresponding to the user command.

2. The electronic apparatus of claim 1, wherein the first microphone set is configured to focus in a first angle corresponding to the first audio signal and the second microphone set is configured to focus in a second angle corresponding to the second audio signal, based on a preset trigger word being received.

3. The electronic apparatus of claim 1, wherein the processor is further configured to select the first microphone set and the second microphone set from among a plurality of microphone sets, based on reliability of sound collection performed in each of the plurality of microphone sets.

4. The electronic apparatus of claim 3, wherein the processor is further configured to:
   identify the user command based on a microphone set from among the plurality of microphone sets, of which reliability is highest; and
   select the first microphone set and the second microphone set from among the plurality of microphone sets based on the operation not being normally performed.

5. The electronic apparatus of claim 1, wherein the processor is further configured to:
   select a third audio signal from among a plurality of audio signals based on the plurality of first sound-source components not being normally identified from the first audio signal;
   identify a plurality of third sound-source components based on the third audio signal; and
   compare the plurality of third sound-source components with the plurality of second sound-source components.

6. The electronic apparatus of claim 5, wherein the processor is further configured to control the electronic apparatus to generate a notification indicating that a speech recognition operation corresponding to the first audio signal is not performed.

7. The electronic apparatus of claim 1, wherein the processor is further configured to control the electronic apparatus to receive the first audio signal from a first device comprising the first microphone set through the interface and to receive the second audio signal from a second device comprising the second microphone set through the interface.

8. The electronic apparatus of claim 1, wherein the processor is further configured to identify a plurality of Euclidean distances between the plurality of first sound-source components and the plurality of second sound-source components, and identify the first sound-source component and the second sound-source component based on a Euclidean distance between the first sound-source component and the second sound-source component being a shortest distance from among the plurality of Euclidean distances.

9. The electronic apparatus of claim 1, wherein the processor is further configured to select sound-source components which will be subjected to comparison, from among the plurality of first sound-source components and the plurality of second sound-source components, based on time characteristics.

10. An electronic apparatus comprising:
    an interface configured to receive a first audio signal from a first microphone set and receive a second audio signal from a second microphone set provided at a position different from that of the first microphone set;

a processor configured to:
obtain a plurality of first sound-source components based on the first audio signal and a plurality of second sound-source components based on the second audio signal;
identify a first sound-source component, from among the plurality of first sound-source components, and a second sound-source component, from among the plurality of second sound-source components, that correspond to each other;
identify a user command based on the first sound-source component and the second sound-source component; and
control an operation corresponding to the user command,
wherein the processor is further configured to identify sound-source components which are constant over a period of time, from among the plurality of first sound-source components and the plurality of second sound-source components, and exclude the identified sound-source components from the sound-source components to be subjected to the comparison.

11. The electronic apparatus of claim 1, wherein the plurality of first sound-source components comprise a plurality of first audio signal time components and the plurality of second sound-source components comprise a plurality of second audio signal time components.

12. The electronic apparatus of claim 1, wherein the interface is further configured to receive the first audio signal from a first external device comprising a first microphone set, and receive the second audio signal from a second external device comprising a second microphone set, wherein the first external device is provided at a position different from that of the second external device.

13. The electronic apparatus of claim 12, wherein the interface comprises a wireless interface configured to receive the first audio signal from the first external device and the second audio signal from the second external device.

14. A method of controlling an electronic apparatus, comprising:
obtaining a plurality of first sound-source components based on a first audio signal obtained from a first microphone set, the plurality of first sound-source components comprising a plurality of first audio signal frequency components;
obtaining a plurality of second sound-source components based on a second audio signal obtained from a second microphone set provided at a position different from that of the first microphone set, the plurality of second sound-source components comprising a plurality of second audio signal frequency components;
identifying a first sound-source component, from among the plurality of first sound-source components and a second sound-source component, from among the plurality of second sound-source components, by comparing each of the plurality of first sound-source components with each of the plurality of second sound-source components, wherein the identified first sound-source component and the identified second sound-source component correspond to each other;
identifying a user command based on the first sound-source component and the second sound-source component; and
performing an operation corresponding to the user command.

15. The method of claim 14, further comprising focusing the first microphone set and the second microphone set in a direction where a preset trigger word is received.

16. The method of claim 14, further comprising selecting the first microphone set and the second microphone set from among a plurality of microphone sets, based on reliability of sound collection performed in each of the plurality of microphone sets.

17. The method of claim 16, further comprising:
attempting to identify the user command based on a microphone set from among the plurality of microphone sets, of which reliability is highest; and
selecting the first microphone set and the second microphone set from among the plurality of microphone sets based on the operation not being normally performed.

18. The method of claim 14, further comprising:
selecting a third audio signal from among a plurality of audio signals based on the plurality of first sound-source components not being normally identified from the first audio signal;
identifying a plurality of third sound-source components based on the third audio signal; and
comparing the plurality of third sound-source components with the plurality of second sound-source components.

* * * * *